United States Patent
Chen et al.

(10) Patent No.: US 7,889,464 B2
(45) Date of Patent: Feb. 15, 2011

(54) LEAKAGE CURRENT DETECTION INTERRUPTER WITH FIRE PROTECTION MEANS

(75) Inventors: Wusheng Chen, Yueqing Zhejiang (CN); Fu Wang, Yueqing Zhejiang (CN); Yong Dai, Yueqing Zhejiang (CN); Xiaoyong Li, Yueqing Zhejiang (CN); Huaiyin Song, Yueqing Zhejiang (CN)

(73) Assignee: General Protecht Group, Inc., Yueqing, Zhejiang (CN)

( * ) Notice: Subject to any disclaimer, the term of this patent is extended or adjusted under 35 U.S.C. 154(b) by 46 days.

(21) Appl. No.: 11/588,044

(22) Filed: Oct. 26, 2006

(65) Prior Publication Data
US 2007/0146946 A1  Jun. 28, 2007

(30) Foreign Application Priority Data
Dec. 23, 2005  (CN) .................. 2005 1 0132613

(51) Int. Cl.
*H02H 3/10* (2006.01)
(52) U.S. Cl. .......................................... 361/42
(58) Field of Classification Search ............ 361/42
See application file for complete search history.

(56) References Cited

U.S. PATENT DOCUMENTS

| | | |
|---|---|---|
| 4,931,894 A | 6/1990 | Legatti |
| 4,979,070 A | 12/1990 | Bodkin |
| 5,053,931 A | 10/1991 | Rushing |
| 5,223,810 A | 6/1993 | Van Haaren |
| 5,229,730 A | 7/1993 | Legatti et al. |
| 5,334,939 A | 8/1994 | Yarbrough |
| 5,363,269 A | 11/1994 | McDonald |
| 5,418,678 A | 5/1995 | McDonald |
| 5,448,443 A | 9/1995 | Muelleman |
| 5,473,113 A * | 12/1995 | Aldissi ..................... 174/36 |
| 5,477,412 A | 12/1995 | Neiger et al. |
| 5,541,800 A | 7/1996 | Misencik |
| 5,642,248 A * | 6/1997 | Campolo et al. .......... 361/42 |
| 5,654,857 A | 8/1997 | Gershen |

(Continued)

FOREIGN PATENT DOCUMENTS

NL    EP0155715 A1 *  2/1985

OTHER PUBLICATIONS

Leeb, Karl-Erik, ProofCap: Electric shielding and protection against humidity, May 2, 2001, ProofCap, www.proofcap.se.*

*Primary Examiner*—Jared J Fureman
*Assistant Examiner*—Nicholas Ieva
(74) *Attorney, Agent, or Firm*—Tim Tingkang Xia; Morris, Manning & Martin, LLP

(57) ABSTRACT

A leakage current detection interrupter with fire protection means, comprising: (i) a leakage current protection circuit, (ii) an electrical cord with metallic fire shields, and (iii) a fire protection circuit, wherein, in operation, the leakage current protection circuit and the fire protection circuit detect a fault condition including a leakage current, a ground fault and a fire hazard, and disconnect the source of electricity from the at least one user accessible load when leakage current, ground fault or fire hazard is detected. The electrical cord with metallic fire shields, the fire protection circuit, and the indicator circuit can be combined with any ground fault circuit interrupter, arc fault circuit interrupter, immerse detection circuit interrupter, appliance leakage current interrupter and electronic leakage current interrupter.

10 Claims, 6 Drawing Sheets

U.S. PATENT DOCUMENTS

| | | | |
|---|---|---|---|
| 5,661,623 A | 8/1997 | McDonald et al. | |
| 5,673,360 A | 9/1997 | Scripps | |
| 5,684,272 A | 11/1997 | Gernhardt et al. | |
| 5,694,280 A * | 12/1997 | Zhou | 361/45 |
| 5,706,155 A | 1/1998 | Neiger et al. | |
| 5,729,417 A | 3/1998 | Neiger et al. | |
| 5,757,598 A | 5/1998 | Aromin | |
| 5,786,971 A | 7/1998 | Chan et al. | |
| 5,825,599 A | 10/1998 | Rosenbaum | |
| 5,841,615 A | 11/1998 | Gershen | |
| 5,899,761 A | 5/1999 | Crane et al. | |
| 5,906,517 A | 5/1999 | Crane et al. | |
| 5,963,406 A | 10/1999 | Neiger et al. | |
| 5,963,408 A | 10/1999 | Neiger et al. | |
| 6,021,034 A | 2/2000 | Chan et al. | |
| 6,040,967 A | 3/2000 | DiSalvo | |
| 6,052,265 A | 4/2000 | Zaretsky et al. | |
| 6,052,266 A | 4/2000 | Aromin | |
| 6,128,169 A | 10/2000 | Neiger et al. | |
| 6,226,161 B1 | 5/2001 | Neiger et al. | |
| 6,246,558 B1 | 6/2001 | DiSalvo et al. | |
| 6,252,407 B1 | 6/2001 | Gershen | |
| 6,259,340 B1 | 7/2001 | Fuhr et al. | |
| 6,262,871 B1 | 7/2001 | Nemir et al. | |
| 6,282,070 B1 | 8/2001 | Ziegler et al. | |
| 6,292,337 B1 | 9/2001 | Legatti et al. | |
| 6,339,525 B1 | 1/2002 | Neiger et al. | |
| 6,381,112 B1 | 4/2002 | DiSalvo | |
| 6,381,113 B1 | 4/2002 | Legatti | |
| 6,407,469 B1 | 6/2002 | Cline et al. | |
| 6,407,893 B1 | 6/2002 | Neiger et al. | |
| 6,433,555 B1 * | 8/2002 | Leopold et al. | 324/509 |
| 6,437,700 B1 | 8/2002 | Herzfeld et al. | |
| 6,437,953 B2 | 8/2002 | DiSalvo et al. | |
| 6,437,955 B1 | 8/2002 | Duffy et al. | |
| 6,442,007 B1 | 8/2002 | Li | |
| 6,465,735 B2 | 10/2002 | May | |
| 6,515,564 B2 | 2/2003 | Leopold et al. | |
| 6,532,139 B2 | 3/2003 | Kim et al. | |
| 6,538,862 B1 | 3/2003 | Mason, Jr. et al. | |
| 6,540,533 B1 | 4/2003 | Schreiber | |
| 6,577,478 B2 | 6/2003 | Kim et al. | |
| 6,587,319 B1 * | 7/2003 | Finlay, Sr. | 361/42 |
| 6,611,406 B2 | 8/2003 | Neiger et al. | |
| 6,643,108 B2 | 11/2003 | Cline et al. | |
| 6,646,838 B2 | 11/2003 | Ziegler et al. | |
| 6,657,834 B2 | 12/2003 | DiSalvo | |
| 6,671,145 B2 | 12/2003 | Germain et al. | |
| 6,697,238 B2 | 2/2004 | Bonilla et al. | |
| 6,724,589 B1 | 4/2004 | Funderburk | |
| 6,734,680 B1 | 5/2004 | Conard | |
| 6,734,769 B1 | 5/2004 | Germain et al. | |
| 6,747,367 B2 | 6/2004 | Cline et al. | |
| 6,771,152 B2 | 8/2004 | Germain et al. | |
| 6,788,504 B2 | 9/2004 | Vanderkolk | |
| 6,813,126 B2 | 11/2004 | DiSalvo et al. | |
| 6,826,058 B1 * | 11/2004 | Cafferty et al. | 361/825 |
| 6,828,886 B2 | 12/2004 | Germain et al. | |
| 6,850,394 B2 | 2/2005 | Kim | |
| 6,859,044 B2 | 2/2005 | Hughes | |
| 6,864,766 B2 | 3/2005 | DiSalvo et al. | |
| 6,867,954 B2 | 3/2005 | Wu et al. | |
| 6,873,231 B2 | 3/2005 | Germain et al. | |
| 6,897,381 B2 | 5/2005 | He et al. | |
| 6,915,992 B1 | 7/2005 | Gretz | |
| 6,944,001 B2 | 9/2005 | Ziegler et al. | |
| 6,946,935 B2 | 9/2005 | Wu et al. | |
| 6,949,994 B2 | 9/2005 | Germain et al. | |
| 6,949,995 B2 | 9/2005 | Leopold et al. | |
| 6,954,125 B2 | 10/2005 | Wu et al. | |
| 6,958,463 B1 | 10/2005 | Kochman et al. | |
| 6,963,260 B2 | 11/2005 | Germain et al. | |
| 6,972,572 B2 | 12/2005 | Mernyk et al. | |
| 6,975,492 B2 | 12/2005 | DiSalvo | |
| 6,982,856 B2 | 1/2006 | Bernstein | |
| 6,991,495 B1 | 1/2006 | Aromin | |
| 7,136,266 B2 * | 11/2006 | Gershen et al. | 361/42 |
| 2004/0070899 A1 * | 4/2004 | Gershen et al. | 361/42 |
| 2006/0198066 A1 | 9/2006 | Chen et al. | |

* cited by examiner (A)

(B)

LEAKAGE CURRENT DETECTION INTERRUPTER WITH FIRE PROTECTION MEANS

CROSS-REFERENCE TO RELATED APPLICATION

This application claims priority of Chinese Patent Application No. 2005 1013 2613.1, filed on Dec. 23, 2005, entitled "A Leakage Current Detection Interrupter with Fire Protection Means" by Wusheng CHEN, Fu WANG, Yong DAI, Xiaoyong LI, and Huaiyin SONG, the disclosure of which is incorporated herein by reference in its entirety.

FIELD OF THE PRESENT INVENTION

The present invention generally relates to real time detection of fault of a leakage current protection device for appliances. More particularly, the present invention relates to a leakage current detection interrupter with fire protection means.

BACKGROUND OF THE PRESENT INVENTION

As the awareness of product safety and demands for higher performance and safer appliances, electrical/electronic products, manufacturer of various appliances, power suppliers, power connectors, and wall outlets are looking for new ways to improve the safety of these products. Products such as surge protectors, leakage current detection interrupters (herein after "LCDI"), and ground fault circuit interrupters (hereinafter after "GFCI") are only a few examples. These products protect against current-surge protection, voltage-surge protection, leakage current protection and ground fault protection. However, they share a common deficiency: protection against wire breakage and/or fire protection. From time to time, power cords are broken/damaged by small animals such as rats or by accidental cuts during house renovation. For appliances demanding large current such as electrical stove, electrical dryer, or air condition units, fire hazard is a great concern to their users. In case of emergency such as fire or explosion, a safety device with power cord/power connector that can prevent damages during these situations is greatly needed. Such safety device is able to detect the emergency such as fire and/or explosion, to cut off the electrical power from its source, to sustain the fire and/or explosion and to prevent further damages.

Therefore, a heretofore unaddressed need exists in the art to address the aforementioned deficiencies and inadequacies.

SUMMARY OF THE PRESENT INVENTION

In one aspect, the present invention relates to a leakage current detection interrupter. In one embodiment, the leakage current detection interrupter has: (i) a movable assembly housing, (ii) a first fixed contact holders and a second fixed contact holder, (iii) a first movable contact holder and a first movable contact, (iv) a movable assembly, (v) a resetting component, (vi) a resetting component spring, (vii) an electromagnetic tripping component, (viii) an leakage current protection circuit.

The movable assembly housing has a first side surface and an opposite, second side surface, and a body defined therebetween. The body of movable assembly housing defines two vertical openings on the first side surface and the second surface. The first fixed contact holders has a first fixed contact point and the second fixed contact holder has a second fixed contact point. Each of the first movable contact holder and a second movable contact holder has a fixed end attached to the movable assembly housing and a movable end. The first movable end has a first movable contact arranged for contacting the second fixed contact and the second movable end has a second movable contact arranged for contacting the first fixed contact.

The movable assembly that moves between a first position in which each fixed contact makes contact with the respective movable contact and a second position in which the fixed contacts are separated from the movable contacts. The resetting component has a first end accessible to a user for resetting the leakage current detection interrupter and a second end with a tapered tip and a notch. When the movable assembly is in the first position, the resetting component is engaged with the movable assembly. When the movable assembly is in the second position, the resetting component spring releases the resetting component and disengages the movable assembly. The electromagnetic tripping component, when energized in responsive to a fault condition, causes the movable assembly to be in the second position from the first position, and therefore causing the resetting component to disengage the movable assembly.

The leakage current protection circuit assembled on a printed circuit board for detecting the fault condition. The fault condition includes a condition when a leakage current is detected, and a condition when a ground fault is detected. The leakage current protection circuit has a first input, a second input, a third input, a first output, a second output and a third output, wherein the leakage current protection circuit is capable of detecting a fault condition and energizing the electromagnetic tripping component to cause resetting component to disengage the movable assembly in responsive to the fault condition.

In one embodiment, the leakage current protection circuit further has: (i) a first switch having a first terminal connected the first input, and a second terminal connected to the first output, for opening and closing the connection between the first input and the first output, (ii) a second switch having a first terminal connected the second input, and a second terminal connected to the second output, for opening and closing the connection between the second input and the second output, (iii) an trip coil having a first terminal connected to the first input and a second terminal, where the trip coil simultaneously controls the opening and closing of the first switch and the second switch, (iv) an inductive coil having a first terminal and a second terminal for detecting current difference in the line between the first input and the first output and the line between the second input and the second output, (v) a leakage current detection circuit. The leakage current detection circuit has a first input connected to the first terminal of the inductive coil and a second input connected to the second terminal of the inductive coil, a first output terminal connected to the second terminal of the trip coil and a second output terminal connected to the second input. The leakage current detection circuit detects a fault condition through the inductive coil and passes a current to the first output terminal to activate the trip coil and causes the first switch and the second switch to open the circuit simultaneously, thus disconnecting the source of electricity from the at least one user accessible load.

In one embodiment, the leakage current detection circuit further has: (i) a first capacitor connected in parallel to the first input and the second input, (ii) an integrated circuit having a first terminal, a second terminal, a third terminal connected to the second input, a fourth terminal connected to the second output terminal, a fifth terminal, a sixth terminal, a seventh terminal, and an eighth terminal, (iii) a first resistor having a first terminal connected to the first input, and a second terminal connected to the second terminal of the integrated circuit, (iv) a second resistor having a first terminal connected to the first terminal of the integrated circuit and the a second terminal connected to the second terminal of the integrated circuit, (v) a second capacitor having a first terminal connected to the sixth terminal of the integrated circuit, and a second terminal connected to the second output terminal, (vi) a third capacitor having a first terminal connected to the seventh terminal of the integrated circuit, and a second output terminal, (vii) a fourth capacitor having a first terminal connected to the eighth terminal of the integrated circuit, and a second terminal connected to the second output terminal, (viii) a silicon controlled rectifier having a cathode connected to the second output terminal, a gate connected to the first terminal of the third capacitor and the seventh terminal of the integrated circuit, and an anode connected to the first output terminal, (ix) a fifth resistor having a first terminal connected to the first output terminal and the anode of the silicon controlled rectifier, and a second terminal, and (x) a sixth diode having an anode connected to the second terminal of the fifth resistor, and a cathode connected to the fifth terminal of the integrated circuit.

The movable assembly has: (i) a trip coil frame with an opening through the center of the trip coil frame and with the electromagnetic tripping component wound on the trip coil frame, (ii) a magnetic core having a first end and an opposite, second end, with the first end positioned outside of the center opening of the trip coil frame and the second end positioned inside of the center opening of the trip coil frame, (iii) a core spring to keep the magnetic core in the first position when no fault condition is detected and the electromagnetic tripping component is not energized, (vi) a resetting component locker having a upper portion and a lower portion, and (v) a balance frame.

The magnetic core stays in the first position when no fault condition is detected and moves to the second position when a fault condition is detected and the electromagnetic tripping component is energized. The lower portion of the resetting component locker is substantially perpendicular to the upper portion. The upper portion of the resetting component locker is slidably attached to the first end of the magnetic core outside of the center opening of the trip coil frame. The balance frame has a first surface, an opposite, second surface, a first side surface, an opposite, second side surface, a top surface and an opposite, bottom surface, and a body portion defined therebetween, a first contact support protruding from the first side surface away from the body portion, a second contact support protruding from the second side surface away from the body portion. The body portion defines an opening through the center of the top surface through center of the bottom surface of the body portion, and a slot in proximity of the bottom surface through the first surface and the second surface of the body portion where the lower portion of the resetting component locker is slidably inserted. The balance frame is able to slide up and down along the two vertical openings of the movable assembly housing.

When the resetting component is pressed, the notch of the resetting component pushes the resetting component locker horizontally so the resetting component locker is engaged with the notch of the resetting component and locks resetting component, and the resilience of the resetting component spring pulls the balance frame and the resetting component locker upward such that the first movable contact holder and the second movable contact holder are pushed upward by the contact supports on both sides of the balance frame and causes the movable assembly in the first position. When a fault condition is detected by the leakage current protection circuit, a current is directed to the electromagnetic tripping component causing an electromagnetic force to pull the magnetic core towards the trip coil frame, along with the resetting component locker, such that the resetting component locker is released from the engagement with the resetting component, and the balance frame together with the resetting component locker moves downward at the action of the resilience force of the first movable contact holder and the second movable contact holder to set the movable assembly in the second position.

In another aspect, the present invention relates to a leakage current detection interrupter with fire protection means. In one embodiment, the leakage current detection interrupter with fire protection means has: (i) a leakage current protection circuit, (ii) an electrical cord with metallic fire shields having a fire protection terminal, (iii) a fire protection circuit, and (iv) an indicator circuit. The leakage current protection circuit has a line phase terminal, a line neutral terminal, a line ground terminal, a first output, a second output and a third output. The line phase terminal, the line neutral terminal, and the line ground terminal are connectable to a source of electricity. The first output, the second output and the third output are connectable to at least one user accessible load. The fire protection circuit has a first terminal connected to the line phase terminal of the leakage current protection circuit, a second terminal connected to the line neutral terminal, and a third terminal. The leakage current protection circuit and the fire protection circuit detect a fault condition and disconnects the source of electricity from the at least one user accessible load when leakage current, ground fault or fire hazard is detected. The indicator circuit has a phase terminal, a neutral terminal and a ground terminal, a protection terminal, a load phase terminal connected to the phase terminal, a load neutral terminal connected to the neutral terminal and a load ground terminal connected to the ground terminal. The fault condition includes a condition when a leakage current is detected, a condition when a ground fault is detected, and a condition when a fire hazard is detected.

In one embodiment, the leakage current detection interrupter has: (i) a movable assembly housing, (ii) a first fixed contact holders and a second fixed contact holder, (iii) a first movable contact holder and a first movable contact, (iv) a movable assembly, (v) a resetting component, (vi) a resetting component spring, (vii) an electromagnetic tripping component, (viii) an leakage current protection circuit.

The movable assembly housing has a first side surface and an opposite, second side surface, and a body defined therebetween. The body of movable assembly housing defines two vertical openings on the first side surface and the second surface. The first fixed contact holders has a first fixed contact point and the second fixed contact holder has a second fixed contact point. Each of the first movable contact holder and a second movable contact holder has a fixed end attached to the movable assembly housing and a movable end. The first movable end has a first movable contact arranged for contacting the second fixed contact and the second movable end has a second movable contact arranged for contacting the first fixed contact.

The movable assembly that moves between a first position in which each fixed contact makes contact with the respective movable contact and a second position in which the fixed contacts are separated from the movable contacts. The resetting component has a first end accessible to a user for resetting the leakage current detection interrupter and a second end with a tapered tip and a notch. When the movable assembly is in the first position, the resetting component is engaged with the movable assembly. When the movable assembly is in the second position, the resetting component spring releases the resetting component and disengages the movable assembly. The electromagnetic tripping component, when energized in responsive to a fault condition, causes the movable assembly to be in the second position from the first position, and therefore causing the resetting component to disengage the movable assembly.

The leakage current protection circuit assembled on a printed circuit board for detecting the fault condition. The fault condition includes a condition when a leakage current is detected, and a condition when a ground fault is detected. The leakage current protection circuit has a first input, a second input, a third input, a first output, a second output and a third output, wherein the leakage current protection circuit is capable of detecting a fault condition and energizing the electromagnetic tripping component to cause resetting component to disengage the movable assembly in responsive to the fault condition.

In one embodiment, the leakage current protection circuit further has: (i) a first switch having a first terminal connected the first input, and a second terminal connected to the first output, for opening and closing the connection between the first input and the first output, (ii) a second switch having a first terminal connected the first input, and a second terminal connected to the first output, for opening and closing the connection between the first input and the first output, (iii) an trip coil having a first terminal connected to the first input and a second terminal, where the trip coil simultaneously controls the opening and closing of the first switch and the second switch, (iv) an inductive coil having a first terminal and a second terminal for detecting current difference in the line between the first input and the first output and the line between the second input and the second output, (v) a leakage current detection circuit. The leakage current detection circuit has a first input connected to the first terminal of the inductive coil and a second input connected to the second terminal of the inductive coil, a first output terminal connected to the second terminal of the trip coil and a second output terminal connected to the second input. The leakage current detection circuit detects a fault condition through the inductive coil and passes a current to the first output terminal to activate the trip coil and causes the first switch and the second switch to open the circuit simultaneously, thus disconnecting the source of electricity from the at least one user accessible load.

In one embodiment, the leakage current detection circuit further has: (i) a first capacitor connected in parallel to the first input and the second input, (ii) an integrated circuit having a first terminal, a second terminal, a third terminal connected to the second input, a fourth terminal connected to the second output terminal, a fifth terminal, a sixth terminal, a seventh terminal, and an eighth terminal, (iii) a first resistor having a first terminal connected to the first input, and a second terminal connected to the second terminal of the integrated circuit, (iv) a second resistor having a first terminal connected to the first terminal of the integrated circuit and the a second terminal connected to the second terminal of the integrated circuit, (v) a second capacitor having a first terminal connected to the sixth terminal of the integrated circuit, and a second terminal connected to the second output terminal, (vi) a third capacitor having a first terminal connected to the seventh terminal of the integrated circuit, and a second output terminal, (vii) a fourth capacitor having a first terminal connected to the eighth terminal of the integrated circuit, and a second terminal connected to the second output terminal, (viii) a silicon controlled rectifier having a cathode connected to the second output terminal, a gate connected to the first terminal of the third capacitor and the seventh terminal of the integrated circuit, and an anode connected to the first output terminal, (ix) a fifth resistor having a first terminal connected to the first output terminal and the anode of the silicon controlled rectifier, and a second terminal, and (x) a sixth diode having an anode connected to the second terminal of the fifth resistor, and a cathode connected to the fifth terminal of the integrated circuit.

The movable assembly has: (i) a trip coil frame with an opening through the center of the trip coil frame and with the electromagnetic tripping component wound on the trip coil frame, (ii) a magnetic core having a first end and an opposite, second end, with the first end positioned outside of the center opening of the trip coil frame and the second end positioned inside of the center opening of the trip coil frame, (iii) a core spring to keep the magnetic core in the first position when no fault condition is detected and the electromagnetic tripping component is not energized, (vi) a resetting component locker having a upper portion and a lower portion, and (v) a balance frame.

The magnetic core stays in the first position when no fault condition is detected and moves to the second position when a fault condition is detected and the electromagnetic tripping component is energized. The lower portion of the resetting component locker is substantially perpendicular to the upper portion. The upper portion of the resetting component locker is slidably attached to the first end of the magnetic core outside of the center opening of the trip coil frame. The balance frame has a first surface, an opposite, second surface, a first side surface, an opposite, second side surface, a top surface and an opposite, bottom surface, and a body portion defined therebetween, a first contact support protruding from the first side surface away from the body portion, a second contact support protruding from the second side surface away from the body portion. The body portion defines an opening through the center of the top surface through center of the bottom surface of the body portion, and a slot in proximity of the bottom surface through the first surface and the second surface of the body portion where the lower portion of the resetting component locker is slidably inserted. The balance frame is able to slide up and down along the two vertical openings of the movable assembly housing.

When the resetting component is pressed, the notch of the resetting component pushes the resetting component locker horizontally so the resetting component locker is engaged with the notch of the resetting component and locks resetting component, and the resilience of the resetting component spring pulls the balance frame and the resetting component locker upward such that the first movable contact holder and the second movable contact holder are pushed upward by the contact supports on both sides of the balance frame and causes the movable assembly in the first position. When a fault condition is detected by the leakage current protection circuit, a current is directed to the electromagnetic tripping component causing an electromagnetic force to pull the magnetic core towards the trip coil frame, along with the resetting component locker, such that the resetting component locker is released from the engagement with the resetting component, and the balance frame together with the resetting component locker moves downward at the action of the resilience force of the first movable contact holder and the second movable contact holder to set the movable assembly in the second position.

In one embodiment, the electromagnetic tripping component is covered by a metal shield on four sides for protecting electromagnetic tripping component from failing during a fire condition. The electrical cord with metallic fire shields has: (i) a neutral wire, (ii) a phase wire, (iii) a ground wire, (iv) a fire protection terminal, and (v) metallic fire shields covering all wires. The electrical cord has a first end for connecting to the leakage current detection interrupter with fire protection means, and a second end for connecting to at least one user accessible load.

In one embodiment, the fire protection circuit has: (i) a second rectifying diode having an anode connected to the line phase terminal, and a cathode, (ii) a third rectifying diode having an anode connected to the line neutral terminal, and a cathode, and (iii) a fourth resistor having a first terminal connected to the cathode of the second rectifying diode and the cathode of the third rectifying diode, and a second terminal connected to the fire protection terminal. The second rectifying diode and the third rectifying diode provide a bypass to the current through the leakage current detection interrupter. When the electrical cord with metallic fire shields is damaged, or a fire hazard occurs, the leakage current detection interrupter disconnects the at least one user accessible load from the source of electricity.

In one embodiment, the second end of the electrical cord with metallic fire shield has at least one electrical plug. In another embodiment, the second end of the electrical cord with metallic fire shield has at least one electrical socket.

In one embodiment, the leakage current detection interrupter with fire protection means further includes an indicator circuit. The indicator circuit has: (i) a fourth diode having an anode connected to the protection terminal, and a cathode, (ii) a ninth resistor having a first terminal connected to the cathode of the fourth diode, and a second terminal, (iii) a fifth light emitting diode (LED) having an anode connected to a second terminal of ninth resistor and a cathode connected to the load neutral terminal. When the leakage current detection interrupter with fire protection means does not detect any fault condition, the LED lights up indicating normal working condition. When the electrical cord with metallic fire shields is damaged such that the metallic fire shield covering both the phase wire and the neutral wire is exposed to the phase wire, or neutral wire, or both, the LED is not lit.

In a third aspect, the present invention relates to a leakage current detection interrupter. In one embodiment, the leakage current detection interrupter has: (i) a movable assembly housing, (ii) a first fixed contact holders and a second fixed contact holder, (iii) a first movable contact holder and a first movable contact, (iv) a movable assembly, (v) a resetting component, (vi) a resetting component spring, and (vii) an electromagnetic tripping component.

The movable assembly housing has a first side surface and an opposite, second side surface, and a body defined therebetween. The body of movable assembly housing defines two vertical openings on the first side surface and the second surface. The first fixed contact holders has a first fixed contact point and the second fixed contact holder has a second fixed contact point. Each of the first movable contact holder and a second movable contact holder has a fixed end attached to the movable assembly housing and a movable end. The first movable end has a first movable contact arranged for contacting the second fixed contact and the second movable end has a second movable contact arranged for contacting the first fixed contact.

The movable assembly that moves between a first position in which each fixed contact makes contact with the respective movable contact and a second position in which the fixed contacts are separated from the movable contacts. The resetting component has a first end accessible to a user for resetting the leakage current detection interrupter and a second end with a tapered tip and a notch. When the movable assembly is in the first position, the resetting component is engaged with the movable assembly. When the movable assembly is in the second position, the resetting component spring releases the resetting component and disengages the movable assembly. The electromagnetic tripping component, when energized in responsive to a fault condition, causes the movable assembly to be in the second position from the first position, and therefore causing the resetting component to disengage the movable assembly. The fault condition includes a condition when a leakage current is detected and a condition when a ground fault is detected.

The movable assembly has: (i) a trip coil frame with an opening through the center of the trip coil frame and with the electromagnetic tripping component wound on the trip coil frame, (ii) a magnetic core having a first end and an opposite, second end, with the first end positioned outside of the center opening of the trip coil frame and the second end positioned inside of the center opening of the trip coil frame, (iii) a core spring to keep the magnetic core in the first position when no fault condition is detected and the electromagnetic tripping component is not energized, (vi) a resetting component locker having a upper portion and a lower portion, and (v) a balance frame.

The magnetic core stays in the first position when no fault condition is detected and moves to the second position when a fault condition is detected and the electromagnetic tripping component is energized. The lower portion of the resetting component locker is substantially perpendicular to the upper portion. The upper portion of the resetting component locker is slidably attached to the first end of the magnetic core outside of the center opening of the trip coil frame. The balance frame has a first surface, an opposite, second surface, a first side surface, an opposite, second side surface, a top surface and an opposite, bottom surface, and a body portion defined therebetween, a first contact support protruding from the first side surface away from the body portion, a second contact support protruding from the second side surface away from the body portion. The body portion defines an opening through the center of the top surface through center of the bottom surface of the body portion, and a slot in proximity of the bottom surface through the first surface and the second surface of the body portion where the lower portion of the resetting component locker is slidably inserted. The balance frame is able to slide up and down along the two vertical openings of the movable assembly housing.

When the resetting component is pressed, the notch of the resetting component pushes the resetting component locker horizontally so the resetting component locker is engaged with the notch of the resetting component and locks resetting component, and the resilience of the resetting component spring pulls the balance frame and the resetting component locker upward such that the first movable contact holder and the second movable contact holder are pushed upward by the contact supports on both sides of the balance frame and causes the movable assembly in the first position. When a fault condition is detected by the leakage current protection circuit, a current is directed to the electromagnetic tripping component causing an electromagnetic force to pull the magnetic core towards the trip coil frame, along with the resetting component locker, such that the resetting component locker is released from the engagement with the resetting component, and the balance frame together with the resetting component locker moves downward at the action of the resilience force of the first movable contact holder and the second movable contact holder to set the movable assembly in the second position.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

Further features and benefits of the present invention will be apparent from a detailed description of preferred embodiments thereof taken in conjunction with the following drawings, wherein similar elements are referred to with similar reference numbers, and wherein:

FIG. 6A shows a front view of the device. FIG. 6B shows a side view of the device. FIG. 6C shows a rear view of the device. FIG. 6D shows a perspective rear view of the device. FIG. 6E shows a perspective front view of the device.

DETAILED DESCRIPTION OF THE PRESENT INVENTION

Prior to a detailed description of the present invention(s), the following definitions are provided as an aid to understanding the subject matter and terminology of aspects of the present invention(s), and not necessarily limiting of the present invention(s), which are expressed in the claims. Whether or not a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. A capitalized term within the glossary usually indicates that the capitalized term has a separate definition within the glossary. However, the capitalization or lack thereof within the remainder of this document is not intended to be necessarily limiting unless the context clearly indicates that such limitation is intended. The terms "unit" and "circuit" are interchangeable.

A switching device usually can be in two states: a conductive state and a non-conductive state. When the switching device is in conductive state, a current is allowed to pass through. When the switching device is in non-conductive state, no current is allowed to pass through.

DEFINITIONS/GLOSSARY

AC: alternate current
AFCI: arc fault circuit interrupter.
ALCI: appliance leakage current interrupter.
ELCI: electronic leakage current interrupter.
GFCI: ground fault circuit interrupter.
IDCI: immerse detection circuit interrupter.
LCDI: leakage current detection interrupter.
LED: light emitting diode.
SCR: silicon controlled rectifier.

System Overview

The description will be made as to the embodiments of the present invention in conjunction with the reference to the accompanying drawings in FIGS. 1-6. In accordance with the purposes of this invention, as embodied and broadly described herein, this invention, in one aspect, relates to a leakage current detection interrupter with fire protection means.

Figure 1:
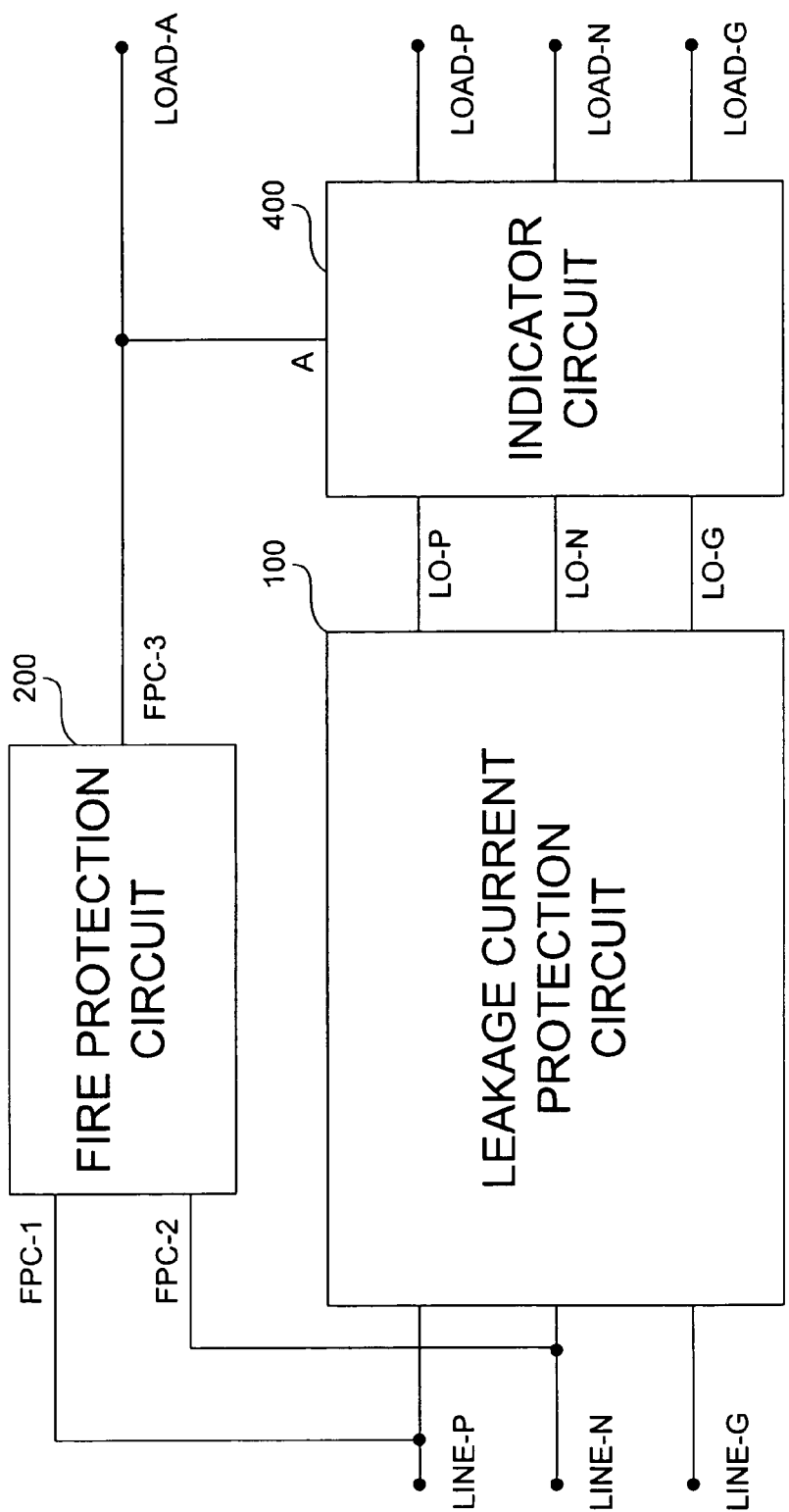
FIG. 1 shows an exemplary block diagram of a leakage current detection interrupter with fire protection means according to one embodiment of the present invention.

FIG. 1 shows a block diagram of a leakage current detection interrupter with fire protection means according to one embodiment of the present invention. The leakage current detection interrupter with fire protection means has: (i) a leakage current protection circuit 100, (ii) an electrical cord with metallic fire shields having a fire protection terminal A, (iii) a fire protection circuit 200, and (iv) an indicator circuit 400. The leakage current protection circuit 100 has a line phase terminal LINE-P, a line neutral terminal LINE-N, a line ground terminal LINE-G, a first output LO-P, a second output LO-N and a third output LO-G. The line phase terminal LINE-P, the line neutral terminal LINE-N, and the line ground terminal LINE-G are connectable to a source of electricity. The first output LO-P, the second output LO-N and the third output LO-G are connectable to at least one user accessible load. The fire protection circuit 200 has a first terminal FPC-1 connected to the line phase terminal LINE-P of the leakage current protection circuit 100, a second terminal FPC-2 connected to the line neutral terminal LINE-N, and a third terminal FPC-3. The leakage current protection circuit 100 and the fire protection circuit 200 detect a fault condition and disconnects the source of electricity from the at least one user accessible load when leakage current, ground fault or fire hazard is detected. The indicator circuit 400 has a phase terminal LO-P, a neutral terminal LO-N and a ground terminal LO-G, a protection terminal A, a load phase terminal LOAD-P connected to the phase terminal LO-P, a load neutral terminal LOAD-N connected to the neutral terminal LO-N and a load ground terminal LOAD-G connected to the ground terminal LO-G. The fault condition includes a condition when a leakage current is detected, a condition when a ground fault is detected, and a condition when a fire hazard is detected.

Electronic Structure of an LCDI

Figure 2:
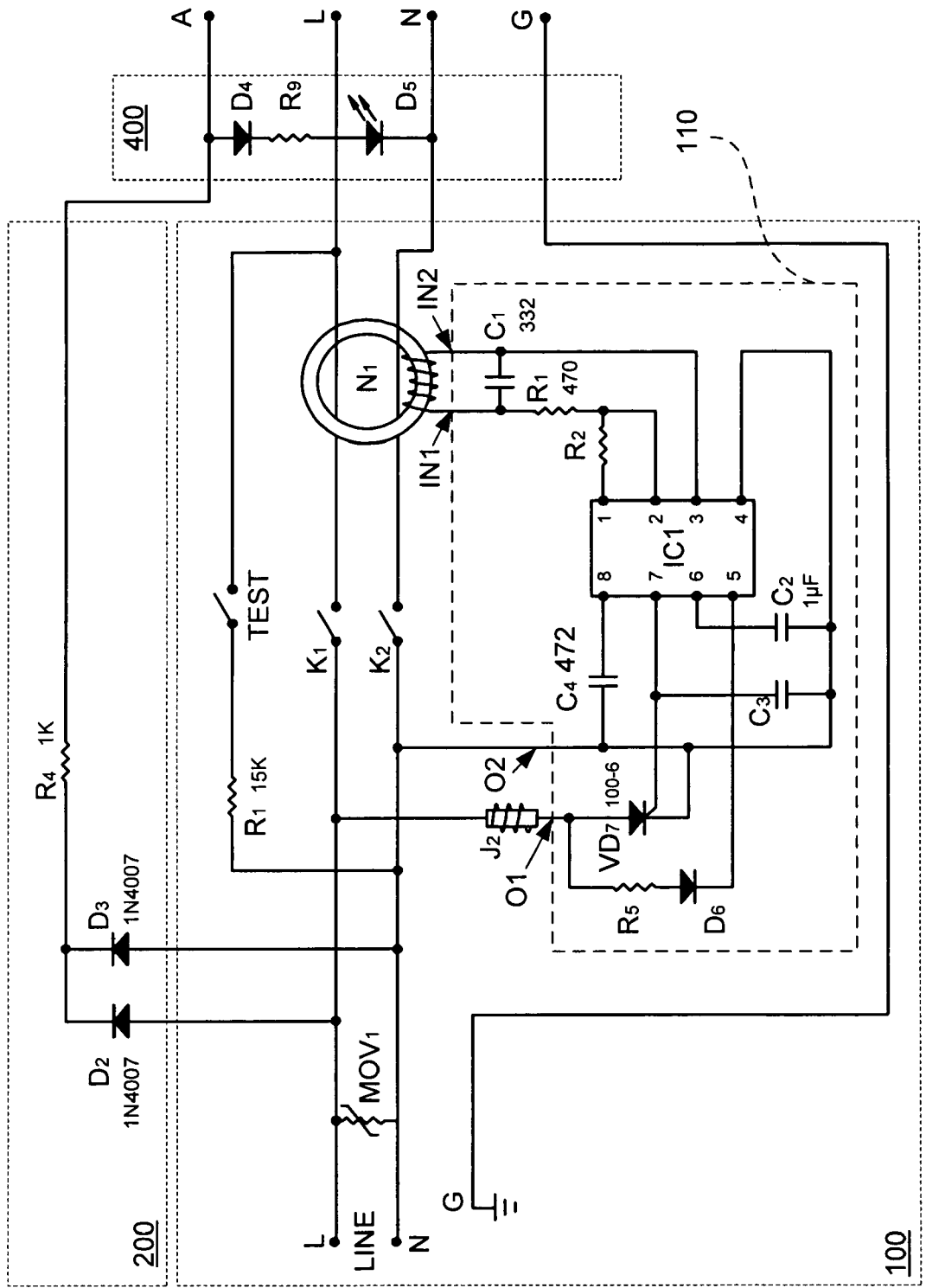
FIG. 2 shows an exemplary circuit diagram of a leakage current detection interrupter with fire protection means, according to one embodiment of the present invention.

The detailed electronic circuit is depicted in the circuit diagram shown in FIG. 2 according to one embodiment of the present invention. The leakage current protection circuit 100 is capable of detecting a fault condition and energizing the electromagnetic tripping component 316 to cause resetting component 301 to disengage the movable assembly in responsive to the fault condition. The fault condition includes a condition when a leakage current is detected, and a condition when a ground fault is detected. The leakage current protection circuit 100

As shown in FIG. 2, the leakage current protection circuit 100 includes:
- a first switch K1 having a first terminal connected the first input LINE-P, and a second terminal connected to the first output LO-P, for opening and closing the connection between the first input LINE-P and the first output LO-P;
- a second switch K2 having a first terminal connected the first input LINE-N, and a second terminal connected to the first output LO-N, for opening and closing the connection between the first input LINE-N and the first output LO-N;
- an trip coil J2 having a first terminal connected to the first input LINE-P and a second terminal, where the trip coil J2 simultaneously controls the opening and closing of the first switch K1 and the second switch K2;
- an inductive coil N1 having a first terminal and a second terminal for detecting current difference in the line between the first input LINE-P and the first output LO-P and the line between the second input LINE-N and the second output LO-N; and
- a leakage current detection circuit 110.

Referring now to FIGS. 1 and 2, the leakage current detection circuit 110 includes:
- a first input IN1 connected to the first terminal of the inductive coil N1;
- a second input IN2 connected to the second terminal of the inductive coil N1;
- a first output terminal O1 connected to the second terminal of the trip coil J2; and
- a second output terminal O2 connected to the second input LINE-N. The leakage current detection circuit 110 detects a fault condition through the inductive coil N1 and passes a current to the first output terminal O1 to activate the trip coil J2 and causes the first switch K1 and the second switch K2 to open the circuit simultaneously, thus disconnecting the source of electricity from the at least one user accessible load.

As shown in FIG. 2, the leakage current detection circuit 110 further includes:
- a first capacitor C1 connected in parallel to the first input IN1 and the second input IN2;
- an integrated circuit IC1 having a first terminal, a second terminal, a third terminal connected to the second input IN2, a fourth terminal connected to the second output O2, a fifth terminal, a sixth terminal, a seventh terminal, and an eighth terminal;
- a first resistor R1 having a first terminal connected to the first input IN1, and a second terminal connected to the second terminal of the integrated circuit IC1;
- a second resistor R2 having a first terminal connected to the first terminal of the integrated circuit IC1 and the a second terminal connected to the second terminal of the integrated circuit IC1;
- a second capacitor C2 having a first terminal connected to the sixth terminal of the integrated circuit IC1, and a second terminal connected to the second output O2;
- a third capacitor C3 having a first terminal connected to the seventh terminal of the integrated circuit IC1, and a second output O2;
- a fourth capacitor C4 having a first terminal connected to the eighth terminal of the integrated circuit IC1, and a second terminal connected to the second output O2;
- a silicon controlled rectifier VD7 having a cathode connected to the second output O2, a gate connected to the first terminal of the third capacitor C3 and the seventh terminal of the integrated circuit IC1, and an anode connected to the first output terminal O1;
- a fifth resistor R5 having a first terminal connected to the first output terminal O1 and the anode of the silicon controlled rectifier VD7, and a second terminal; and
- a diode D6 having an anode connected to the second terminal of the fifth resistor R5, and a cathode connected to the fifth terminal of the integrated circuit IC1.

Still referring to FIG. 2, the fire protection circuit 200 includes:
- a second rectifying diode D2 having an anode connected to the line phase terminal LINE-P, and a cathode;
- a third rectifying diode D3 having an anode connected to the line neutral terminal LINE-N, and a cathode; and
- a fourth resistor R4 having a first terminal connected to the cathode of the second rectifying diode D2 and the cathode of the third rectifying diode D3, and a second terminal connected to the fire protection terminal A.

The second rectifying diode D2 and the third rectifying diode D3 provide a by-pass to the current through the leakage current detection interrupter 100. Then the electrical cord with metallic fire shields is damaged, or a fire hazard occurs, the leakage current detection interrupter 100 disconnects the at least one user accessible load from the source of electricity.

The indicator circuit 400 includes:
- a diode D4 having an anode connected to the protection terminal A, and a cathode;
- a ninth resistor R9 having a first terminal connected to the cathode of the diode D4, and a second terminal;
- a light emitting diode (LED) D5 having an anode connected to a second terminal of the ninth resistor R9 and a cathode connected to the load neutral terminal LOAD-N.

When the leakage current detection interrupter with fire protection means does not detect any fault condition, the LED D5 lights up indicating normal working condition. When the electrical cord with metallic fire shields is damaged such that the metallic fire shield covering both the phase wire L and the neutral wire N is exposed to the phase wire L, or neutral wire N, or both, the LED D5 is not lit.

When the electrical cord with metallic fire shields is damaged, the metal cover shield covering both the phase wire L and the neutral wire N may be exposed to the phase wire L, or neutral wire N, or both.

If the fire protection terminal A is connected to the phase wire L, a partial current through the third rectifying diode D3 and the fourth resistor R4 to the neutral line N at the output causes the imbalance of the current on the wires that pass through the inductive coil N1. This imbalance is detected by the IC1 and the IC1's output allows a current to pass through the switching device VD7 and disconnects the source of electricity from the at least one user accessible load.

If the fire protection terminal A is connected to the neutral wire N, a partial current through the second rectifying diode D2 and the fourth resistor R4 to the neutral line N at the output causes the imbalance of the current on the wires that pass through the inductive coil N1. This imbalance is detected by the IC1 and the IC1's output allows a current to pass through the switching device VD7 and disconnects the source of electricity from the at least one user accessible load.

If the fire protection terminal A is connected to both the phase wire L and the neutral wire N, a partial current through the second rectifying diode D2 and the fourth resistor R4 to the neutral line N during the positive half cycle of the source of electricity and a partial current through the third rectifying diode D3 and the fourth resistor R4 to the neutral line N during the negative half cycle of the Source of electricity cause the imbalance of the current on the wires that pass through the inductive coil N1. This imbalance is detected by the IC1 and the IC1's output allows a current to pass through the switching device VD7 and disconnects the source of electricity from the at least one user accessible load.

In one embodiment, the second end of the electrical cord with metallic fire shield has at least one electrical plug. In another embodiment, the second end of the electrical cord with metallic fire shield has at least one electrical socket.

Mechanical Structure of an LCDI

Figure 3:
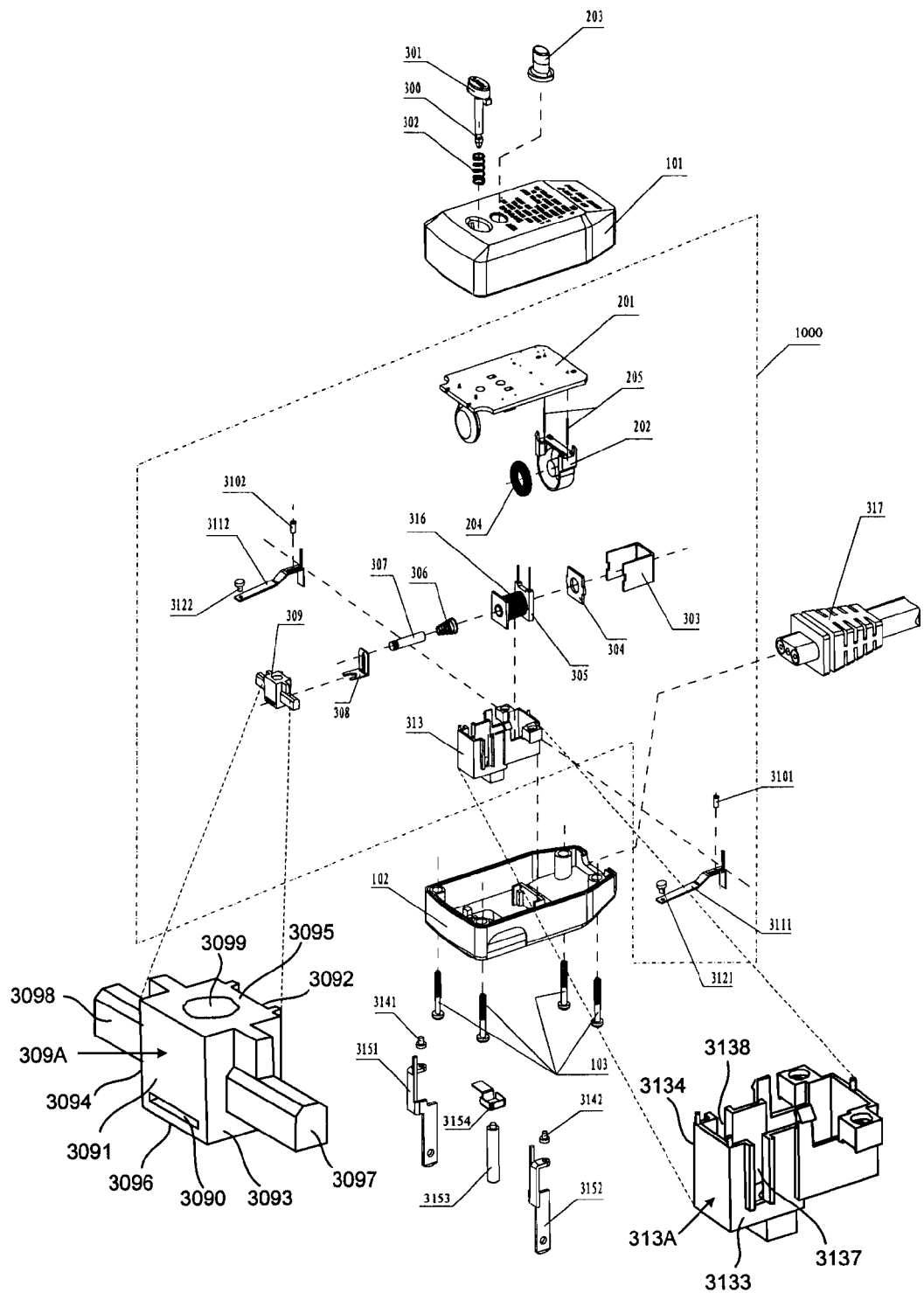
FIG. 3 is an exploded view of a leakage current detection interrupter with fire protection means, according to one embodiment of the present invention.

Referring now to FIG. 3, an exploded view of an LCDI with Fire Protection Means is shown according to one embodiment of the present invention. Mechanically, the LCDI, comprises:

- a upper casing 101, a lower casing 102, a wire connector 317 having three shielded wires connecting to the three wires of the Source of electricity and four fastening screws 103 to attach the upper casing and the lower casing;
- three prongs (one for phase wire 3151, one for neutral wire 3152 and one for ground 3153) for connecting the source of electricity from a wall outlet, the prongs 3151 and 3152 having a stationary contact 3141 and 3142 respectively for connecting to the trip movable contacts and the prong 3153 having a metal contact 3154 for connecting the ground;
- a resetting component 301 with a notch 300 and a tapered end, and a resetting component spring 302;
- a test button 203, being able to make two test contacts on the circuit board 201 contact to each other, when pressed; and
- a circuit board 201, a plurality of electronic components installed on the circuit board 201, and a trip mechanism 1000.

The resetting component 301 has a first end accessible to a user for resetting the leakage current detection interrupter and a second end with a tapered tip and a notch 300. When the movable assembly is in the first position, the resetting component 301 is engaged with the movable assembly. When the movable assembly is in the second position, the resetting component spring 302 releases the resetting component 301 and disengages the movable assembly. The electromagnetic tripping component 316, when energized in responsive to a fault condition, causes the movable assembly to be in the second position from the first position, and therefore causing the resetting component 301 to disengage the movable assembly.

The trip mechanism 1000 includes: (i) a movable assembly housing 313, (ii) a first fixed contact holder 3151 and a second fixed contact holder 3152, (iii) a first movable contact holder 3111 and a second movable contact holder 3112, (iv) a movable assembly, (v) an electromagnetic tripping component 316, (vi) an leakage current protection circuit 100.

The movable assembly housing 313 has a first side surface 3133 and an opposite, second side surface 3134, and a body 313A defined therebetween. Portions of the first side surface 3133 and second side surface 3134 form vertical slots 3137 and 3138, respectively. The first fixed contact holder 3151 has a first fixed contact point 3141 and the second fixed contact holder 3152 has a second fixed contact point 3142. Each of the first movable contact holder 3111 and the second movable contact holder 3112 has a fixed end attached to the movable assembly housing 313 and a movable end. The first movable end has a first movable contact 3121 arranged for contacting the second fixed contact 3142 and the second movable end has a second movable contact 3122 arranged for contacting the first fixed contact 3141. The movable assembly moves between a first position in which each fixed contact makes contact with the respective movable contact and a second position in which the fixed contacts are separated from the movable contacts.

The movable assembly has: (i) a trip coil frame 305 with an opening through the center of the trip coil frame 305 and with the electromagnetic tripping component 316 wound on the trip coil frame 305, (ii) a magnetic core 307 having a first end and an opposite, second end, with the first end positioned outside of the center opening of the trip coil frame 305 and the second end positioned inside of the center opening of the trip coil frame 305, (iii) a core spring 306 to keep the magnetic core 307 in the first position when no fault condition is detected and the electromagnetic tripping component 316 is not energized, (vi) a resetting component locker 308 having a upper portion and a lower portion, and (v) a balance frame 309.

The magnetic core 307 stays in the first position when no fault condition is detected and moves to the second position when a fault condition is detected and the electromagnetic tripping component 316 is energized. The lower portion of the resetting component locker 308 is substantially perpendicular to the upper portion. The upper portion of the resetting component locker 308 is slidably attached to the first end of the magnetic core 307 outside of the center opening of the trip coil frame 305. The balance frame 309 has a first surface 3091, an opposite, second surface 3092, a first side surface 3093, an opposite, second side surface 3094, a top surface 3095 and an opposite, bottom surface 3096, and a body portion 309A defined therebetween, a first contact support 3097 protruding from the first side surface 3093 away from the body portion, a second contact support 3098 protruding from the second side surface 3094 away from the body portion. The body portion defines an opening 3099 through the center of the top surface 3095 through center of the bottom surface 3096 of the body portion 309A, and a slot 3090 in proximity of the bottom surface 3096 through the first surface 3091 and the second surface 3092 of the body portion 309A where the lower portion of the resetting component locker 308 is slidably inserted. The balance frame 309 is able to slide up and down along the two vertical slots 3137, 3138 formed by respective portions of the first side surface 3133 and second side surface 3134 of the movable assembly housing 313.

When the resetting component 301 is pressed, the notch of the resetting component 301 pushes the resetting component locker 308 horizontally so the resetting component locker 308 is engaged with the notch 300 of the resetting component 301 and locks resetting component 301, and the resilience of the resetting component spring 302 pulls the balance frame 309 and the resetting component locker 308 upward such that the first movable contact holder 3111 and the second movable contact holder 3112 are pushed upward by the contact supports on both sides of the balance frame 309 and causes the movable assembly in the first position. When a fault condition is detected by the leakage current protection circuit 100, a current is directed to the electromagnetic tripping component 316 causing an electromagnetic force to pull the magnetic core 307 towards the trip coil frame 305, along with the resetting component locker 308, such that the resetting component locker 308 is released from the engagement with resetting component 301, and the balance frame 309 together with the resetting component locker 308 moves downward at the action of the resilience force of the first movable contact holder 3111 and the second movable contact holder 3112 to set the movable assembly in the second position.

Figure 4:
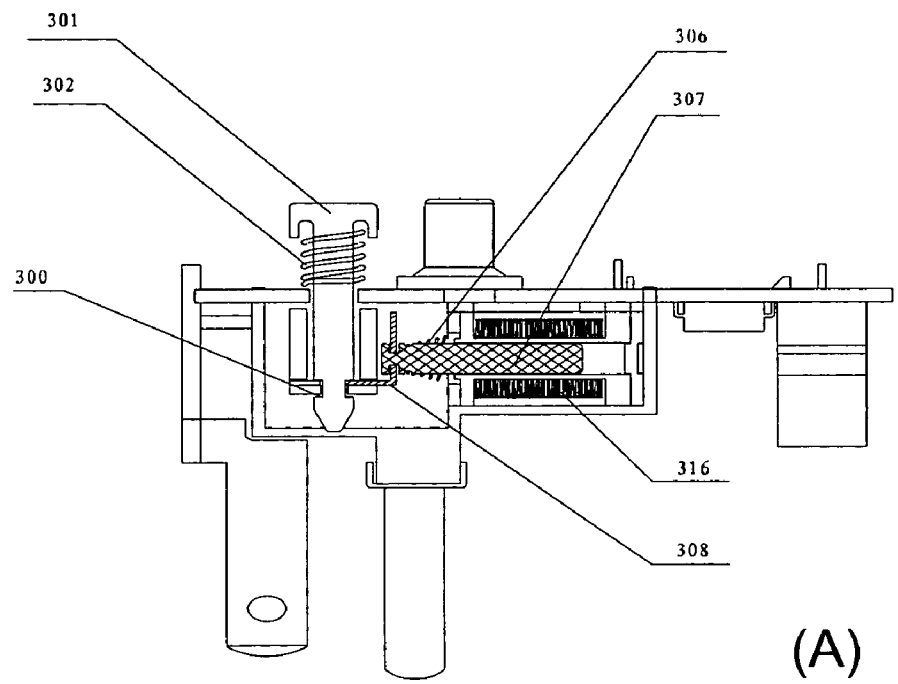
FIGS. 4A and 4B are two detailed side views of a leakage current detection interrupter with fire protection means with its outside casing removed, showing from two opposite sides, when a source of electricity is connected to at least one user accessible load (not in trip condition), according to one embodiment of the present invention.
Figure 4:
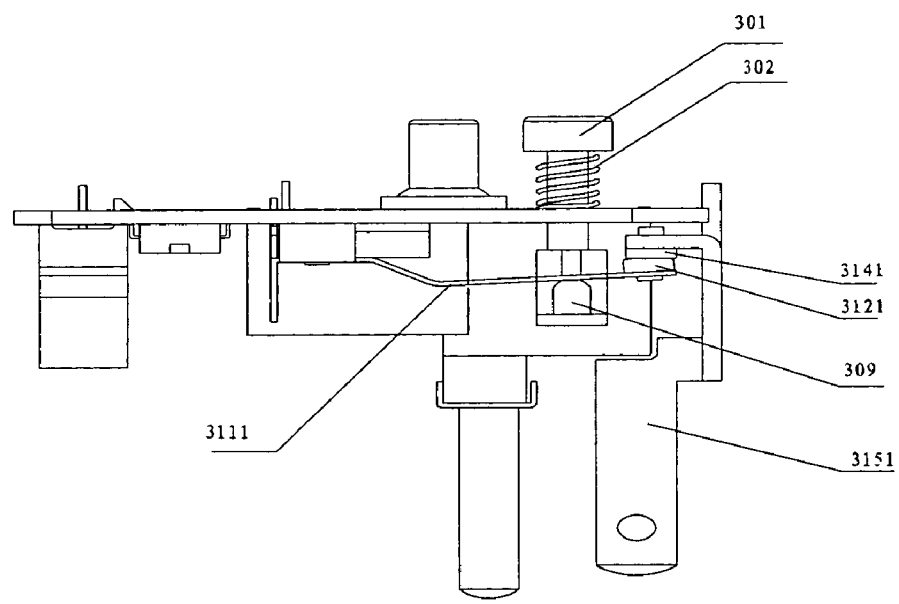

When the LCDI is in a Normal Working Condition: Referring now to FIG. 4 for detail, after the resetting component 301 is pressed, the notch 300 of the resetting component 301 pushes the resetting component locker 308 horizontally so the resetting component locker 308 is engaged with the notch 300 of the resetting component 301 and locks resetting component 301. Due to the resilience of the resetting component spring 302, the balance frame 309 and the resetting component locker 308 are pulled upward. This upward movement brings the first movable contact holder 3111 and the second movable contact holder 3112 upward by the first contact support 3097 and the second contact support 3098 of the balance frame 309. Therefore the input source of electricity is connected through two pairs of silver contacts and the ground prong to the output wires connector 317.

Figure 5:
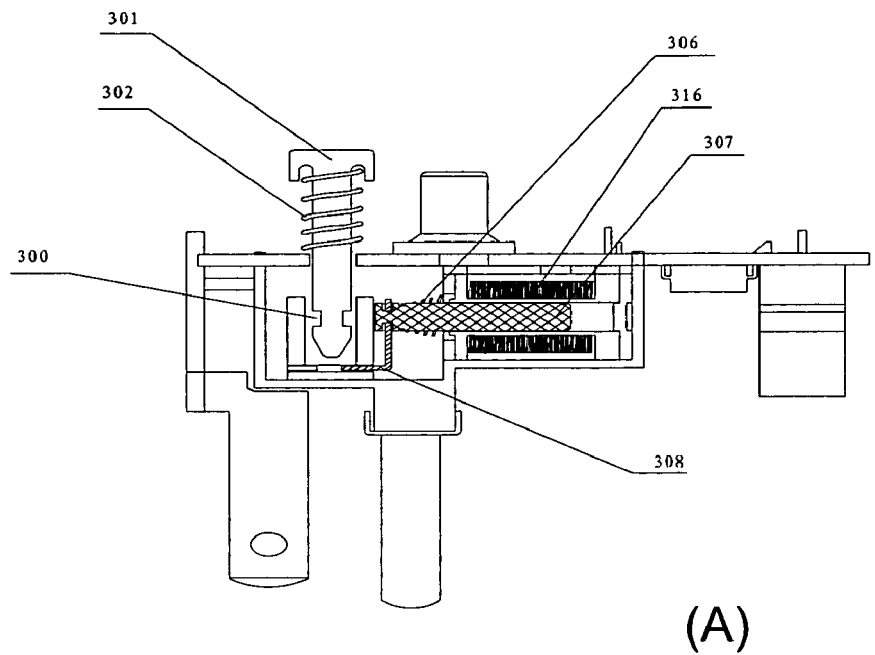
FIGS. 5A and 5B are two detailed side views of a leakage current detection interrupter with fire protection means with its outside casing removed, showing from two opposite sides, when a source of electricity is disconnected from at least one user accessible load (in trip condition), according to one embodiment of the present invention.
Figure 5:
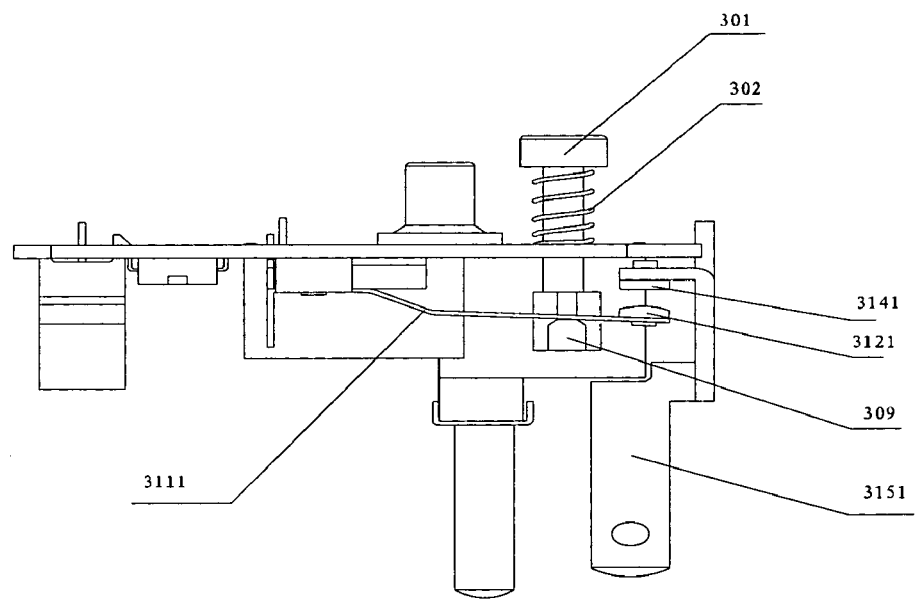

When the LCDI is in a Trip Condition: Referring now to FIG. 5 for detail, when leakage current is detected by the LCDI, or fire hazard occurs, a current passes through the electromagnetic tripping component 316. The current pulls the magnetic core 307 away from the resetting component 301, along with the resetting component locker 308. This movement disengages the resetting component locker 308 from the resetting component 301. The resetting component 301 moves upward through the resilience of the resetting component spring 302. On the other hand, the balance frame 309 together with the resetting component locker 308 moves downward at the action of the resilience of the pair of movable contact arms 3111 and 3112. This downward movement disconnects the source of electricity from the at least one user accessible load.

Figure 6:
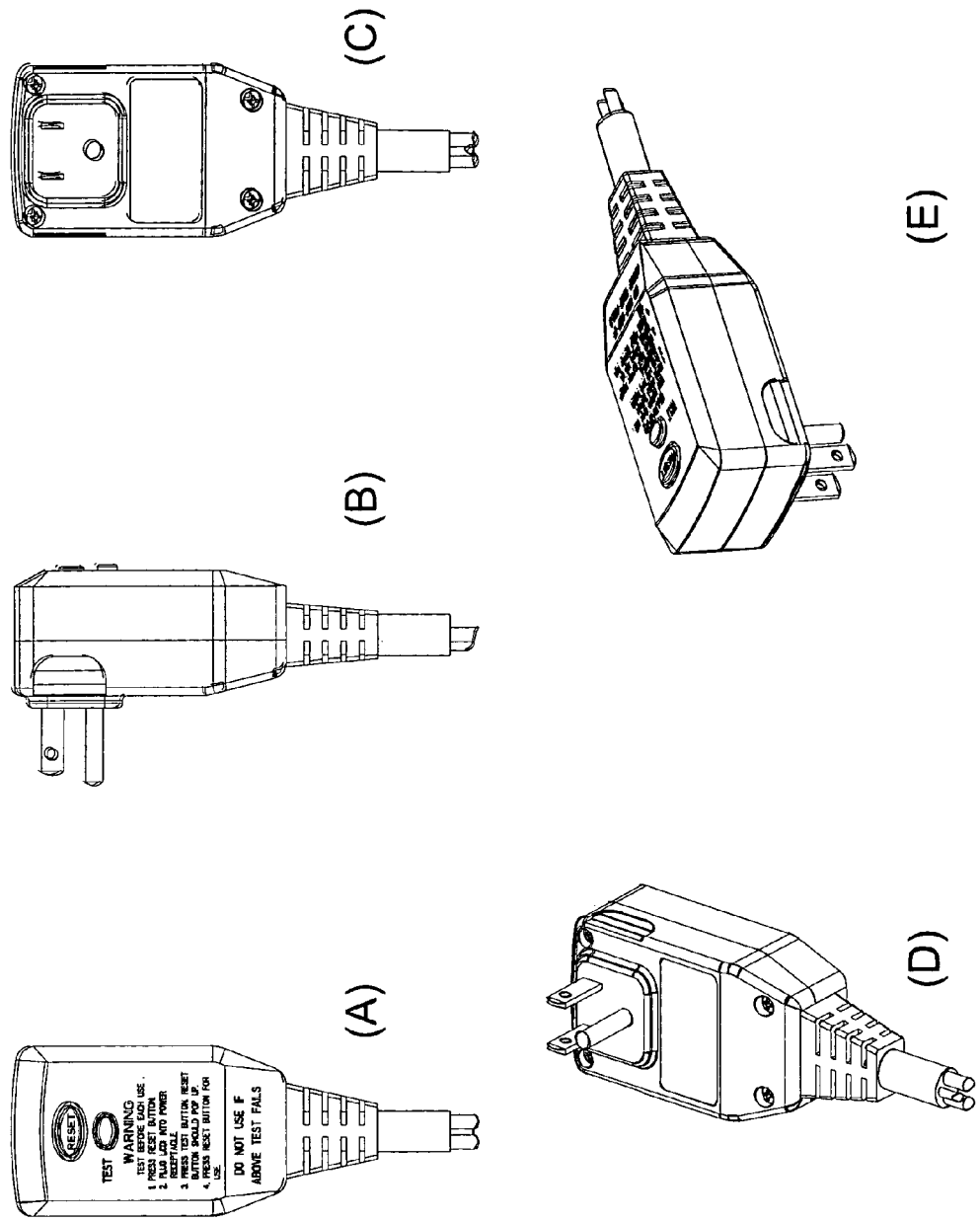
FIG. 6 shows exterior appearance of a fully assembled leakage current detection interrupter with fire protection means (the device) according to one embodiment of the present invention.

FIG. 6 shows exterior appearance of a fully assembled Leakage Current Detection Interrupter with Fire Protection Means (hereinafter "LCDIFPM") according to one embodiment of the present invention. FIG. 6A shows a front view of the LCDIFPM. FIG. 6B shows a side view of the LCDIFPM. FIG. 6C shows a rear view of the LCDIFPM. FIG. 6D shows a perspective rear view of the LCDIFPM. FIG. 6E shows a perspective front view of the LCDIFPM.

The drawings in FIG. 1 indicate LCDIFPM is a power connector with a leakage current protection circuit and fire protection circuit. It receives power from its three prongs plugged into a wall outlet. A wire attached at the tail end of the LCDIFPM provides electric power to any user accessible load, such as appliances. The electrical cord with metallic fire shields, the fire protection circuit 200, and the indicator circuit 400 can be used and combined with any ground fault circuit interrupter, arc fault circuit interrupter, immerse detection circuit interrupter, appliance leakage current interrupter and electronic leakage current interrupter.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A leakage current detection interrupter with fire protection means, comprising:
   (i) a line phase terminal, a line neutral terminal, a line ground terminal, a fire protection terminal, a first output, a line second output and a third output, wherein the line phase terminal, the line neutral terminal, and the line ground terminal are connectable to a source of electricity, and the first output, the second output and the third output are connectable to at least one user accessible load;
   (ii) a leakage current protection circuit having:
      a first switch having a first terminal and a second terminal respectfully connected to the line phase terminal and the first output, an opening position in which the line phase terminal is disconnected to the first output, and a closing position in which the line phase terminal is connected to the first output;
      a second switch having a first terminal and a second terminal respectfully connected to the line neutral terminal and the second output, an opening position in which the line neutral terminal is disconnected to the second output, and a closing position in which the line neutral terminal is connected to the second output;
      an trip coil having a first terminal connected to the first terminal of the first switch and a second terminal coupled to the first terminal of the second switch, configured such that when being activated, the trip coil causes the first switch and the second switch to be in the opening position simultaneously;
      an inductive coil having a first terminal and a second terminal, coupled to the first output and the second output for sensing a current difference in the line from the line phase terminal to the first output and the line from the line neutral terminal to the second output; and
      a leakage current detection circuit having a first input terminal and a second input terminal respectively connected to the first terminal and the second terminal of the inductive coil, a first output terminal connected to the second terminal of the trip coil and a second output terminal connected to the first terminal of the second switch, configured such that when a fault conduction is detected through the inductive coil, the leakage current detection circuit responsively outputs a current to activate the trip coil, thereby causing the first switch and the second switch to be in the opening position simultaneously, wherein the fault conduction is corresponding to the current difference sensed by the inductive coil larger than a predetermined value;
   (iii) an electrical cord having: a phase wire, a neutral wire, a ground wire, an insulation film covering the phase wire, the neutral wire and the ground wire, and a metallic shield covering the insulation film, wherein the phase wire, the neutral wire and the ground wire are respectively connected between the first output, the second output and the third output, and the at least one user accessible load, and the metallic shield is connected to the fire protection terminal;
   (iv) a fire protection circuit having;
      a pair of rectifying diodes, each rectifying diode having an anode and a cathode, wherein the anodes of the pair of rectifying diodes are respectively connected to the line phase terminal and the line neutral terminal; and
      a resistor having a first terminal connected to the cathodes of the pair of rectifying diodes and a second terminal connected to the fire protection terminal,
      wherein when a fire hazard occurs, it causes the insulation film of the electrical cord to melt down so that the metallic shield is contact with one of the core the phase wire, the neutral wire and the ground wire of the electrical cord, which in turn, detours a current from the fire protection terminal through the fire protection circuit, thereby causing the current difference in the line from the line phase terminal to the first output and the line from the line neutral terminal to the second output, which results in the first switch and the second switch in the opening positions; and (v) an indicator circuit having:
a diode having an anode connected to the fire protection terminal, and a cathode;
a resistor having a first terminal connected to the cathode of the diode, and a second terminal; and
a light emitting diode (LED) having an anode connected to a second terminal of the resistor and a cathode connected to the second output,
wherein the LED lights up in a normal working condition in which the first switch and the second switch are in the closing position, and the LED is not lit in a fault condition in which the first switch and the second switch are in the opening position.

2. The leakage current detection interrupter with fire protection means of claim 1, wherein the leakage current protection circuit comprises:

(i) a movable assembly housing having a first side surface and an opposite, second side surface, and a body defined therebetween, wherein the body defines two vertical slots on the first side surface and the second surface for a balance frame to slidably move up and down therein, wherein the balance frame comprises a first surface, an opposite, second surface, a first side surface, an opposite, second side surface, a top surface and an opposite, bottom surface, and a body portion defined therebetween, a first contact support protruding from the first side surface away from the body portion, a second contact support protruding from the second side surface away from the body portion, wherein the body portion defines an opening through the center of the top surface through center of the bottom surface of the body portion, and a slot in proximity of the bottom surface through the first surface and the second surface of the body portion;

(ii) a first fixed contact holder having a first fixed contact, and a second fixed contact holder having a second fixed contact;

(iii) a first movable contact holder and a second movable contact holder, each having a fixed end attached to the movable assembly housing and a movable end, wherein the first movable contact holder has a first movable contact at the movable end and the second movable contact holder has a second movable contact at the movable end, and wherein the fixed end and the movable end of the first movable contact holder and the fixed end and movable end of the second movable contact holder are configured to create a resilience force separating the first movable contact from the second fixed contact and the second movable contact from the first fixed contact;

(iv) a movable assembly operatively associated with the moving assembly housing that moves between a first position in which the first movable contact holder and the second movable contact holder are pushed upwards against the resilience force by the contact supports on both sides of the balance frame such that the first movable contact makes contact with the second fixed contact and the second movable contact makes contact with the first fixed contact, and a second position in which the balance frame moves downward from the action of the resilience force and the first movable contact is separated from the second fixed contact and the second movable contact is separated from the first fixed contact each fixed contact makes contact with the respective movable contact and a second position in which the fixed contacts are separated from the movable contacts;

(v) a resetting component having a first end accessible to a user for resetting the leakage current detection interrupter and a second end with a tapered tip and a notch, which, when the movable assembly is in the first position, is engaged with the movable assembly;

(vi) a resetting component spring which releases the resetting component to disengage the movable assembly for moving from the first position to the second position; and (vii) an electromagnetic tripping component, which, when energized, which is responsive to a fault condition, causes the movable assembly to be in the second position from the first position, thereby causing the resetting component to disengage the movable assembly.

3. The leakage current detection interrupter with fire protection means of claim 2, wherein the movable assembly comprises:

(i) a trip coil frame with an opening through the center of the trip coil frame and with the electromagnetic tripping component wound on the trip coil frame;

(ii) a magnetic core having a first end and an opposite, second end, with the first end positioned outside of the center opening of the trip coil frame and the second end positioned inside of the center opening of the trip coil frame, wherein the magnetic core stays in the first position when no fault condition is detected and moves to the second position when a fault condition is detected and the electromagnetic tripping component is energized;

(iii) a core spring to keep the magnetic core in the first position when no fault condition is detected and the electromagnetic tripping component is not energized;

(iv) a resetting component locker having a upper portion and a lower portion, wherein the lower portion is substantially perpendicular to the upper portion, the upper portion is slidably attached to the first end of the magnetic core outside of the center opening of the trip coil frame; and (v) the balance frame wherein the lower portion of the resetting component locker is slidably insertable in the slot in proximity of the bottom surface, and wherein the balance frame is able to slide up and down along the vertical slots of the movable assembly housing, wherein in operation, when the resetting component is pressed, the notch of the resetting component pushes the resetting component locker horizontally so the resetting component locker is engaged with the notch of the resetting component and locks the resetting component, and the resilience of the resetting component spring pulls the balance frame and the resetting component locker upward such that the first movable contact holder and the second movable contact holder are pushed upward by the contact supports on both sides of the balance frame and causes the movable assembly to be in the first position where the resetting component is slidably inserted in the slot of the balance frame, and when a fault condition is detected by the leakage current protection circuit, a current is directed to the electromagnetic tripping component causing an electromagnetic force to pull the magnetic core towards the trip coil frame, along with the resetting component locker, such that the resetting component locker is released from the engagement with the resetting component, and the balance frame together with the resetting component locker moves downward at the action of the resilience force of the first movable contact holder and the second movable contact holder to set the movable assembly in the second position.

4. The leakage current detection interrupter with fire protection means of claim 3, wherein the electromagnetic tripping component is covered by a metal shield on four sides for protecting the electromagnetic tripping component from failing during a fire condition.

5. The leakage current detection interrupter with fire protection means of claim 1, wherein the electrical cord comprises at least one electrical plug.

6. The leakage current detection interrupter with fire protection means of claim 1, wherein the electrical cord comprises at least one electrical socket.

7. The leakage current detection interrupter with fire protection means of claim 1, wherein the leakage current detection circuit further comprises:
   (i) a first capacitor connected in parallel to the first terminal and the second terminal of the inductive coil;
   (ii) an integrated circuit having a first terminal, a second terminal, a third terminal connected to the second input, a fourth terminal connected to the second output terminal, a fifth terminal, a sixth terminal, a seventh terminal, and an eighth terminal;
   (iii) a first resistor having a first terminal connected to the first terminal of the inductive coil, and a second terminal connected to the second terminal of the integrated circuit;
   (iv) a second resistor having a first terminal connected to the first terminal of the integrated circuit and a second terminal connected to the second terminal of the integrated circuit;
   (v) a second capacitor having a first terminal connected to the sixth terminal of the integrated circuit, and a second terminal connected to the second output terminal;
   (vi) a third capacitor having a first terminal connected to the seventh terminal of the integrated circuit, and a second terminal connected to the second output terminal;
   (vii) a fourth capacitor having a first terminal connected to the eighth terminal of the integrated circuit, and a second terminal connected to the second output terminal;
   (viii) a silicon controlled rectifier having a cathode connected to the second output terminal, a gate connected to the seventh terminal of the integrated circuit, and an anode connected to the first output terminal;
   (ix) a fifth resistor having a first terminal connected to the anode of the silicon controlled rectifier, and a second terminal; and
   (x) a diode having an anode connected to the second terminal of the fifth resistor, and a cathode connected to the fifth terminal of the integrated circuit.

8. A leakage current detection interrupter with fire protection means, comprising:
   (i) a line phase terminal, a line neutral terminal, a line ground terminal, a fire protection terminal, a first output, a line second output and a third output, wherein the line phase terminal, the line neutral terminal, and the line ground terminal are connectable to a source of electricity, and the first output, the second output and the third output are connectable to at least one user accessible load;
   (ii) a leakage current protection circuit having:
   a first switch having a first terminal and a second terminal respectfully connected to the line phase terminal and the first output, an opening position in which the line phase terminal is disconnected to the first output, and a closing position in which the line phase terminal is connected to the first output;
   a second switch having a first terminal and a second terminal respectfully connected to the line neutral terminal and the second output, an opening position in which the line neutral terminal is disconnected to the second output, and a closing position in which the line neutral terminal is connected to the second output;
   an trip coil having a first terminal connected to the first terminal of the first switch and a second terminal coupled to the first terminal of the second switch, configured such that when being activated, the trip coil causes the first switch and the second switch to be in the opening position simultaneously;
   an inductive coil having a first terminal and a second terminal, coupled to the first output and the second output for sensing a current difference in the line from the line phase terminal to the first output and the line from the line neutral terminal to the second output; and
   a leakage current detection circuit having a first input terminal and a second input terminal respectively connected to the first terminal and the second terminal of the inductive coil, a first output terminal connected to the first terminal of the second switch and a second output terminal connected to the second terminal of the trip coil, configured such that when a fault conduction is detected through the inductive coil, the leakage current detection circuit responsively outputs a current to activate the trip coil, thereby causing the first switch and the second switch to be in the opening position simultaneously, wherein the fault conduction is corresponding to the current difference sensed by the inductive coil larger than a predetermined value;
   (iii) an electrical cord having a phase wire, a neutral wire, a ground wire, an insulation film covering the phase wire, the neutral wire and the ground wire, and a metallic shield covering the insulation film, wherein the phase wire, the neutral wire and the ground wire are respectively connected between the first output, the second output and the third output, and the at least one user accessible load, and the metallic shield is connected to the fire protection terminal;
   (iv) a fire protection circuit having:
   a pair of rectifying diodes respectively coupled to the line phase terminal and the line neutral terminal; and
   a resistor coupled between the pair of rectifying diodes and the fire protection terminal,
   wherein when a fire hazard occurs, it causes the insulation film of the electrical cord to melt down so that the metallic shield is contact with one of the core the phase wire, the neutral wire and the ground wire of the electrical cord, which in turn, detours a current from the fire protection terminal through the fire protection circuit, thereby causing the current difference in the line from the line phase terminal to the first output and the line from the line neutral terminal to the second output, which results in the first switch and the second switch in the opening positions; and
   (v) an indicator circuit having:
   a diode having an anode connected to the fire protection terminal, and a cathode;
   a resistor having a first terminal connected to the cathode of the diode, and a second terminal; and
   a light emitting diode (LED) having an anode connected to a second terminal of the resistor and a cathode connected to the second output,
   wherein the LED lights up in a normal working condition in which the first switch and the second switch are in the closing position, and the LED is not lit in a fault condition in which the first switch and the second switch are in the opening position.

9. The leakage current detection interrupter with fire protection means of claim 8, wherein the anodes of the pair of rectifying diodes are respectively connected to the line phase terminal and the line neutral terminal; and the resistor having a first terminal connected to the cathodes of the pair of rectifying diodes and a second terminal connected to the fire protection terminal.

10. The leakage current detection interrupter with fire protection means of claim 8, wherein the cathodes of the pair of rectifying diodes are respectively connected to the line phase terminal and the line neutral terminal; and the resistor having a first terminal connected to the anodes of the pair of rectifying diodes and a second terminal connected to the fire protection terminal.

* * * * *